UNITED STATES PATENT OFFICE.

J. B. NEWBROUGH AND EDWARD FAGAN, OF NEW YORK, N. Y.

IMPROVED MODE OF TREATING CAOUTCHOUC, GUTTA-PERCHA, AND SIMILAR GUMS.

Specification forming part of Letters Patent No. 70,250, dated October 29, 1867.

*To all whom it may concern:*

Be it known that we, J. B. NEWBROUGH and E. FAGAN, of New York city, have invented a new Composition of Matter; and we do hereby declare the following to be a full, clear, and exact description of the same.

Caoutchouc, gutta-percha, Brazilian gum, copal, shellac, amber, or any similar gum, is rolled or worked in any manner whereby it may be formed into sheets. These are then placed one above another, with layers of powdered iodine between them, and the pack is worked between heated rolls, under pressure, until the iodine is thoroughly incorporated with the gum. The composition is then molded, cut, or otherwise reduced to any desired form, and is baked for about thirty minutes (dry heat being preferable) at a temperature of from about 230° to 330° Fahrenheit, when a substance possessing properties distinct from those of the gum employed, and which is available for many useful and ornamental purposes, is produced.

Either an elastic, semi-elastic, or inflexible substance may be produced by combining the gum and iodine in different proportions. For instance, to make a semi-elastic substance, sixteen ounces of gutta-percha (or eight ounces of caoutchouc) should be combined with two ounces of iodine; and a solid or nearly unelastic substance may be formed by the combination of eighteen ounces of gutta-percha (or nine ounces of caoutchouc) and four ounces of iodine. Different colors may be imparted to the composition by the admixture of vermilion or other suitable material; and by immersing the articles in liquid ammonia any unpleasant odor may be removed.

Although we have specified certain proportions in which the ingredients may be combined, these proportions may be varied, as required, to produce any desired result. The gum and iodine may be mixed in a different manner. For instance, the gum may be kneaded or rolled in the presence of the vapor of iodine, with which it will thus become impregnated; the amount of heat applied to the composition may be varied, to vary the character of the substance produced; and steam (superheated, if necessary) may be employed for baking the composition, or the latter may be heated in oil or other material. To produce a cheaper substance, earthy, mineral, or other matters may be mixed with the composition.

We claim as our invention, and desire to secure by Letters Patent, as a new composition—

Gutta-percha or other gums combined with or treated in connection with iodine, in the manner described, or in any other manner by which the within-described result is obtained.

In testimony whereof we have signed our names to this specification in the presence of two subscribing witnesses.

J. B. NEWBROUGH.
E. FAGAN.

Witnesses:
CHARLES E. FOSTER,
C. P. HARTT.